United States Patent [19]
Peuterbaugh

[11] 3,741,048
[45] June 26, 1973

[54] MACHINE TOOL SYSTEM
[75] Inventor: Bruce G. Peuterbaugh, Mount Clemens, Mich.
[73] Assignee: La Salle Machine Tool, Inc., Warren, Mich.
[22] Filed: Aug. 27, 1970
[21] Appl. No.: 67,371

[52] U.S. Cl............... 82/2.5, 29/563, 214/1 BB, 294/106
[51] Int. Cl............................................ B23b 15/00
[58] Field of Search................ 29/33 P, 563, 568; 82/8, 39, 2.5, 2.7, 3; 219/1 BB; 294/106; 10/76 T, 12 T

[56] References Cited
UNITED STATES PATENTS

| | | | |
|---|---|---|---|
| 1,933,225 | 10/1933 | Smith | 214/1 BB |
| 1,993,754 | 3/1935 | Smith et al. | 214/1 BB |
| 3,430,779 | 3/1969 | McElroy | 214/1 BB |
| 2,842,998 | 7/1958 | Kostka | 82/39 |
| 2,714,324 | 8/1955 | Dinsmore et al. | 82/2.7 |
| 3,610,676 | 10/1971 | Richner | 214/1 BB |

Primary Examiner—Andrew R. Juhasz
Assistant Examiner—Z. R. Bilinsky
Attorney—Olsen and Stephenson

[57] ABSTRACT

A machine tool system which includes a plurality of work stations at which workpieces are progressively shaped to a final form and a stationary track assembly extending longitudinally past the work stations. A plurality of workpiece holding units are mounted on the track assembly and are movable longitudinally of the track assembly for advancing workpieces carried thereby to successive work stations. Each of the units includes a downwardly extending body member and a pair of jaws, the jaws being mounted for movement between a workpiece release position located above the workpieces at the work stations and a workpiece gripping position extending downwardly and disposed in gripping engagement with horizontally opposite sides of a workpiece. Thus, the workpiece advancing mechanism is located entirely above the workpieces so that the chips and other metal pieces resulting from work operations carried on at the work stations cannot accumulate on and thus adversely affect the operation of the workpiece advancing mechanism.

2 Claims, 6 Drawing Figures

Patented June 26, 1973

INVENTOR
BRUCE G. PEUTERBAUGH

BY

Olsen and Stephenson
ATTORNEYS

Patented June 26, 1973 3,741,048
4 Sheets-Sheet 2
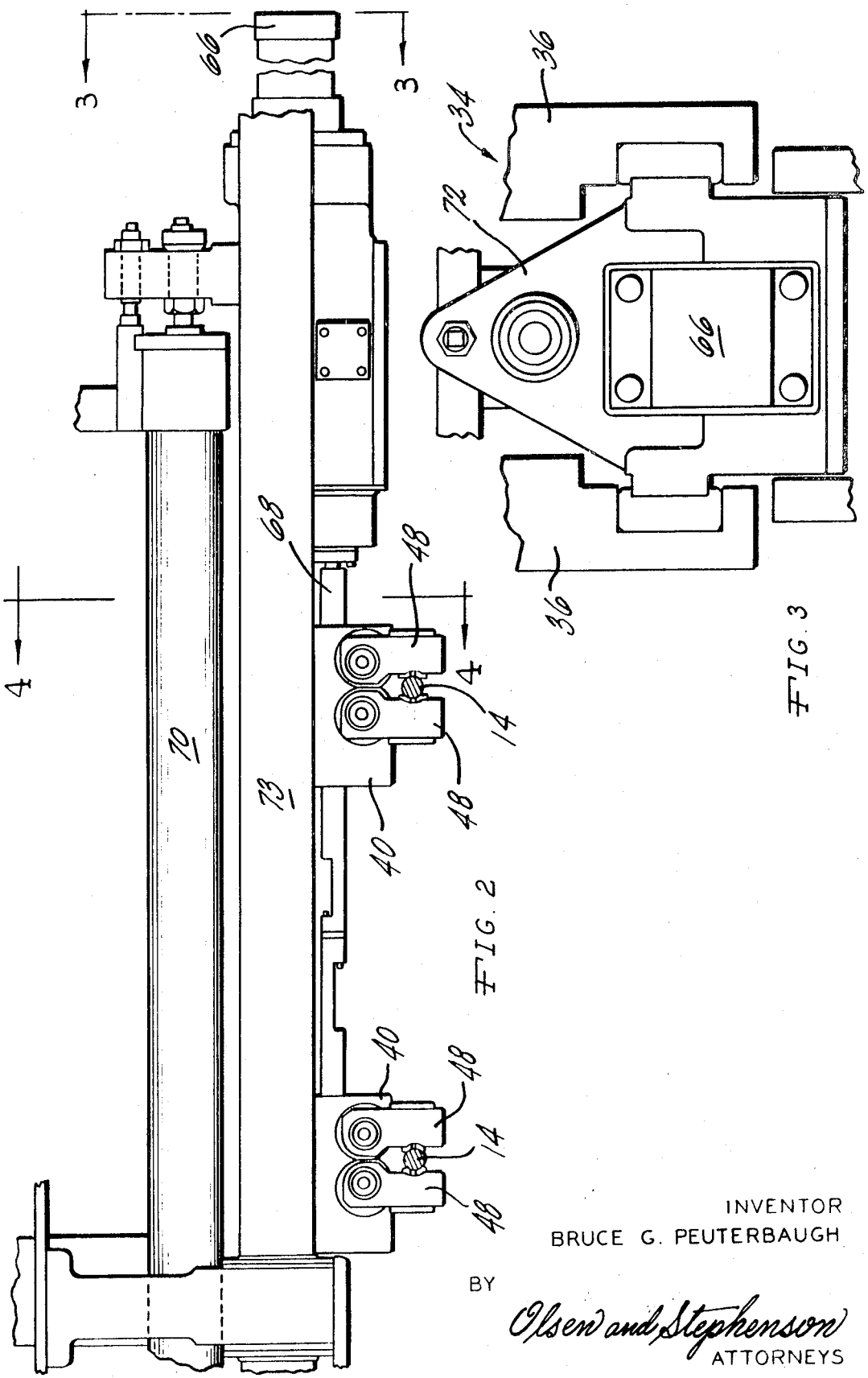

INVENTOR
BRUCE G. PEUTERBAUGH

BY

Olsen and Stephenson
ATTORNEYS

MACHINE TOOL SYSTEM

The machine tool system of this invention is particularly useful in advancing automobile axle shaft workpieces through a plurality of work stations. During the residence of the workpieces at the work stations, various machining functions are performed on the workpiece to ultimately shape it to its desired form. A stationary track assembly is provided which extends longitudinally past the work stations and which extends downwardly from an upper frame. A plurality of workpiece holding units are mounted on the track assembly and a fluid actuated cylinder assembly is provided for advancing the workpiece holding units longitudinally of the track assembly. Each workpiece holding unit includes a pair of workpiece gripping jaws which are movable between release positions and gripping positions. The jaws are pivotally mounted and are movable apart to the positions above the workpieces and are movable toward each other to downwardly extending positions in which they grip opposite sides of the workpiece. The workpiece holding units are arranged in pairs aligned transversely of the track assembly so that pairs of jaws can be operated to grip longitudinally spaced portions of the workpiece. As a result, the workpieces are movable through the work stations and means are provided at each work station for supporting the workpiece and for machining it in a desired manner. To prevent "rubber banding", namely, deflection of the workpiece at a work station, a fluid operated cylinder assembly is provided for engaging the workpiece intermediate its ends for position stabilizing purposes. Since the workpiece transfer apparatus is entirely above the workpieces, all of the chips and metal pieces resulting from the machining operations on the workpieces fall in a direction away from the transfer apparatus. Consequently, in the system of this invention, any possibility of chips accumulating in the transfer apparatus and interfering with the normal function thereof is minimized.

Further objects, features and advantages of this invention will become apparent from a consideration of the following description, the appended claims, and the accompanying drawing in which:

FIG. 2 is an enlarged fragmentary sectional view of a portion of the system of this invention as seen from substantially the line 2—2 in FIG. 1;

FIG. 3 is a fragmentary end view of a portion of the system of this invention as seen from the line 3—3 in FIG. 2;

Figure 5:
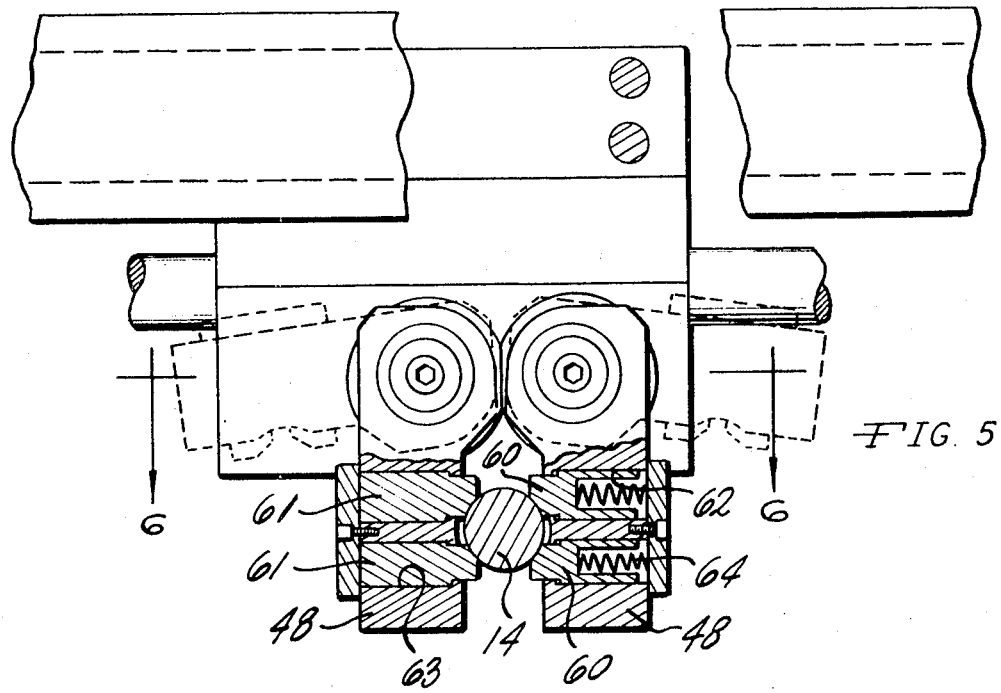
Figure 6:
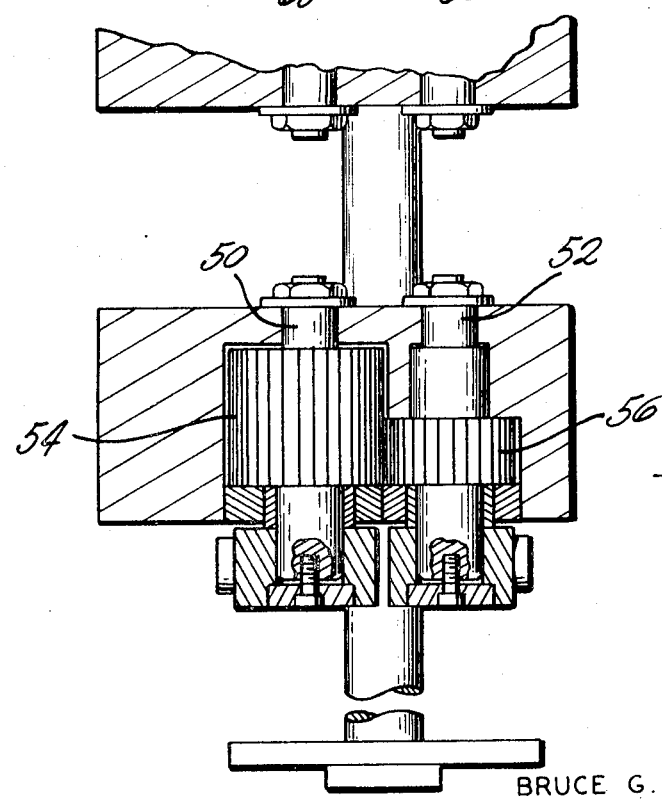

FIG. 5 is a fragmentary detail view of one pair of workpiece gripping jaws in the system of this invention, showing the jaws in release position in broken lines and in gripping position in solid lines, with some parts broken away and other parts shown in section for the purpose of clarity; and FIG. 6 is a fragmentary sectional view of the gripping jaws as seen from substantially the line 6—6 in FIG. 5.

Figure 1:
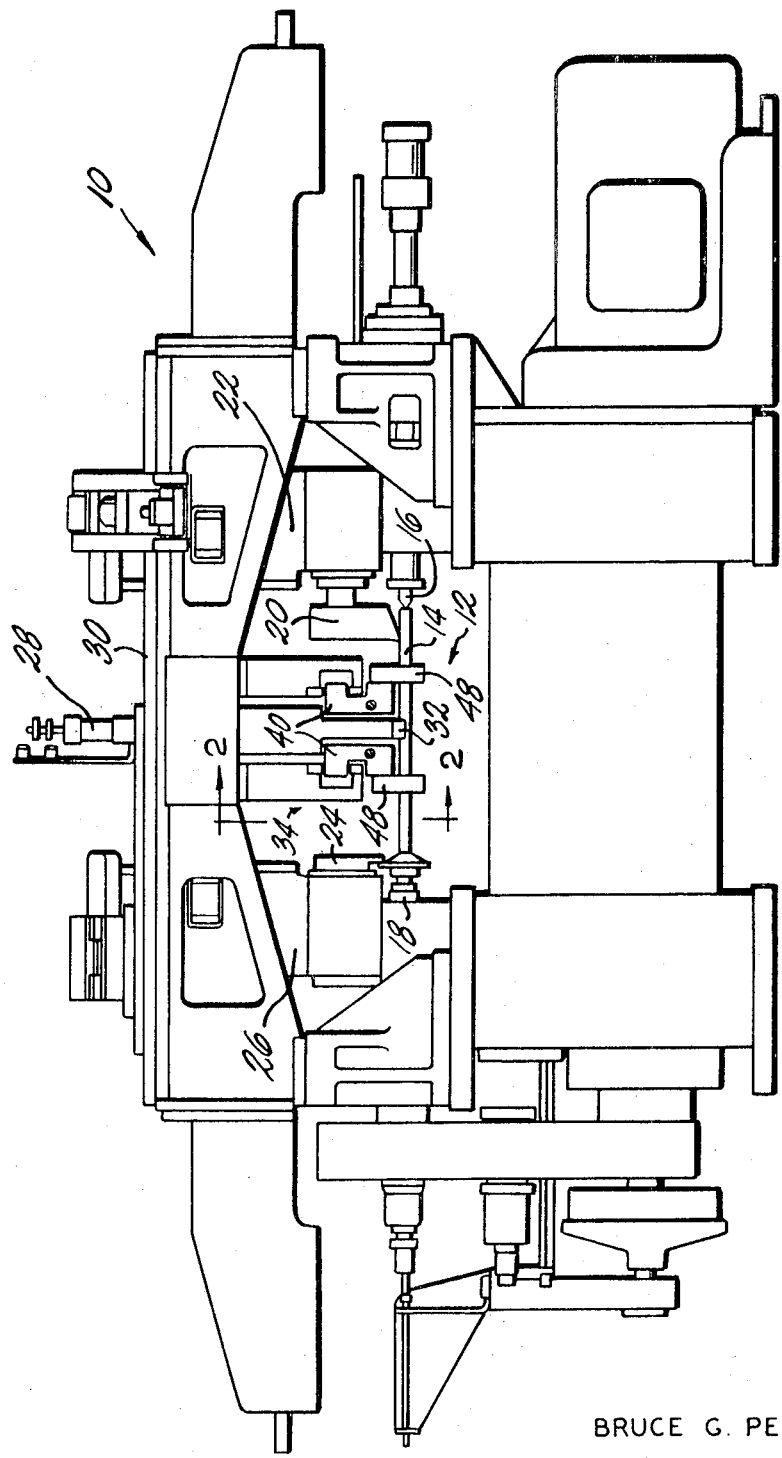
FIG. 1 is a transverse sectional view of the system of this invention.

With refernce to the drawing, the system of this invention, indicated generally at 10 in FIG. 1, consists of a plurality of equally spaced work stations, one of which is indicated at 12 in FIG. 1, at which machining operations are performed on workpieces which, in the illustrated embodiment of the invention, are in the form of rear axle shafts 14 for automobiles. The work station 12 is typical and includes a centering member 16 engageable with one end of the workpiece 14 and a drive spindle 18 engageable with the opposite end of the workpiece 14. Thus, at the work station 12, the workpiece 14 is supported by the centering member 16 and the drive spindle 18 which is also operable to rotate the workpiece 14. The illustrated machining element 20 is mounted on a mechanism 22 operable to move the element 20 downwardly and inwardly into engagement with the workpiece 14 for machining a section of the workpiece 14. Similarly, a machining element 24 is mounted on a mechanism 26 capable of moving the element 24 downwardly and inwardly for machining a face on the workpiece 16. At the work station 12, a fluid actuated cylinder assembly 28 is mounted on an upper frame 30 so that it is operable to move a workpiece stabilizing member 32 downwardly into engagement with the workpiece 14 intermediate the ends thereof for stabilizing the position of the workpiece 14 during machining operations at the workpiece 12. In other words, the stabilizing member 32 prevents rubber banding of the workpiece 14 during machining.

A track assembly 34 is provided which extends longitudinally past the work stations for advancing workpieces 14 through successive work stations. The track assembly 34 includes a pair of transversely spaced downwardly extending frame members 36 and track members 37 mounted on the lower ends of the frame members 36 and provided at their lower ends with surfaces 38 (FIG. 4) on which work holding units 40 are slidably mounted.

Each work holding unit 40 consists of a body membe 42 having a portion 44 supported on the slide surface 38 and a downwardly extending portion 46 on which a pair of workpiece gripping jaws 48 are mounted. The jaws 48 (FIG. 5) are secured to side-by-side parallel shafts 50 and 52 (FIG. 6) which are rotatably supported in the body member portion 46. A gear 54 is secured to the shaft 50 and a gear 56 is secured to the shaft 52 and positioned in meshing engagement with the gear 54. A rack 58 is positioned in meshing engagement with each of the gears 54, and as a result, when the track 58 is moved in one direction, the gear 54 and the gear 56 are rotated in opposite directions to rotate the jaws 48 in directions away from each other to their release positions shown in broken lines in FIG. 5 in which they are disposed above the workpiece 14. On movement of the rack 58 in the opposite direction, the gear 54 and the gear 56 are rotated in opposite directions to move the jaws 48 from their release positions downwardly toward each other to their gripping positions shown in solid lines in FIG. 5 in which the jaws 48 extend downwardly on opposite sides of the workpiece 14.

Figure 4:
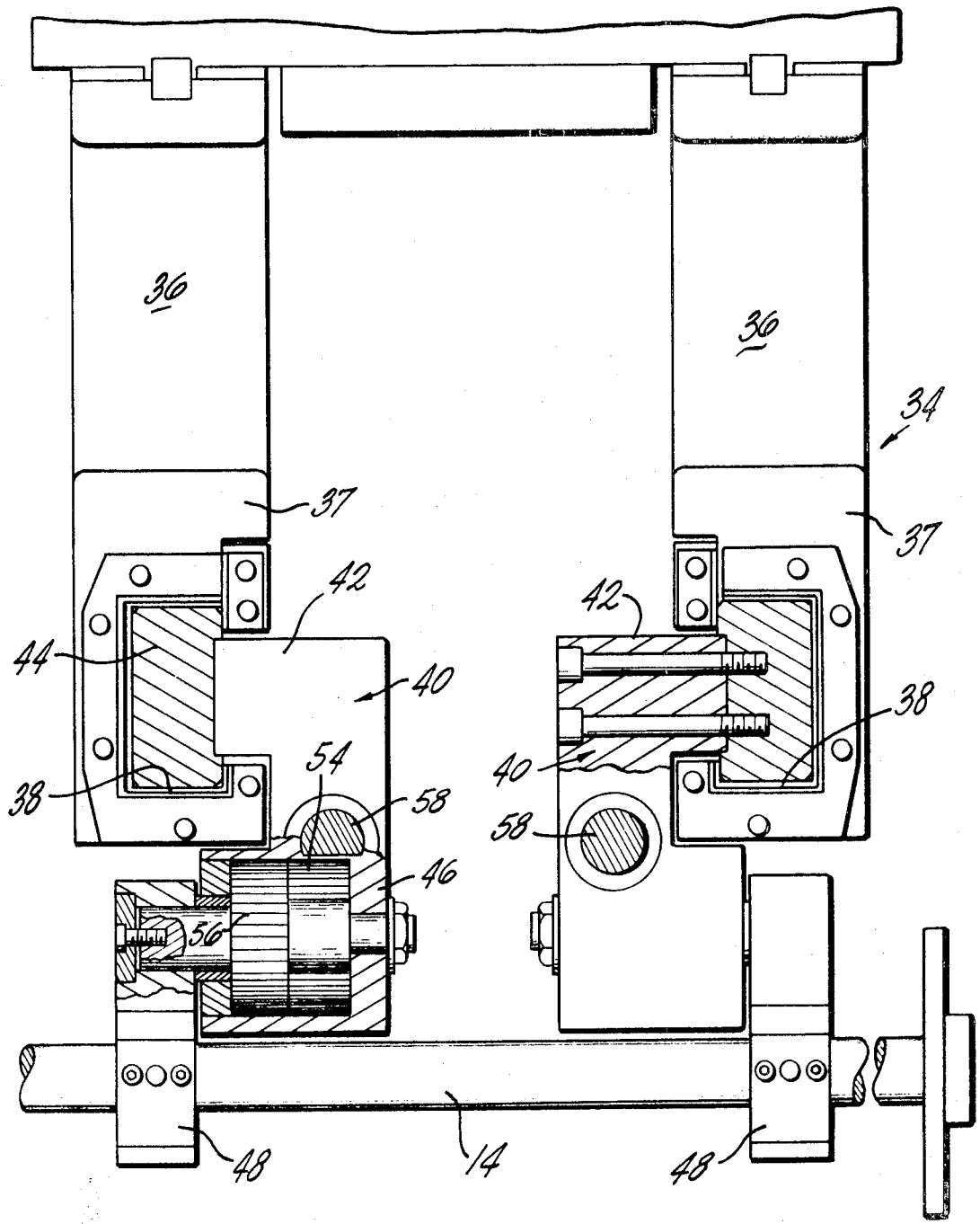
FIG. 4 is an enlarged transverse sectional view of a portion of the system of this invention as seen from substantially the line 4—4 in FIG. 2.

Each pair of jaws 48 carries workpiece engaging inserts 60 and 61 (FIG. 5) which engage opposite sides of a workpiece disposed therebetween. The inserts 60 are slidably mounted in openings 62 in a jaw member 48 and are urged by springs 64 toward the workpiece 14. The inserts 61 are mounted in similar openings 63 and are fixed within the jaw member 48. As a result, when the inserts 60 and 61 engage opposite sides of the workpiece 14, the workpiece 14 is securely gripped therebetween with the springs 64 in inserts 60 permitting adjustable movement of the insert 60 to accommodate tolerance variations in size of workpieces 14. A fluid actuated cylinder assembly 66 (FIGS. 2 and 3) has a piston rod 68 which is connected to the racks 58 which actuate the jaws 48. As shown in FIG. 4, the jaws 48 arranged in transversely aligned pairs and the parallel racks 58 are reciprocated in unison so as to move each aligned pair of jaws 48 in unison. A second fluid actuated cylinder assembly 70 carries a downwardly extending plate 72 which is secured to a connecting frame 73 secured to the workpiece holding units 40 so as to maintain them in a spaced relation corresponding to the spacing between work stations. The cylinder assembly 70 is operable to move the units 40 back and forth between adjacent work stations so as to advance the workpieces 14 through successive work stations.

In the operation of the system 10, assume that the racks 58 have been advanced to move the jaws 48 into gripping engagement with the workpieces 14, two of which are illustrated in FIG. 2, but it is to be understood that a larger number are normally employed. The cylinder assembly 70 is actuated to move the work holding units 40 so as to advance the workpieces 14 to the next successive work station. At the work stations, the workpieces 14 are gripped between the centering member 16 and the spindle 18, and the racks 58 are retracted so as to move the jaws 48 to their open positions shown in FIG. 5 in broken lines. The cylinder assembly 70 is then retracted to return the workpiece holding units 40 to the preceding work stations. During such movement, the jaws 48 are positioned entirely above the workpieces 14 and during machining of the workpieces 14 all of the chips and metal pieces removed therefrom fall downwardly in a direction away from the jaws 48. As a result, there is no danger that the workpiece transfer mechanism will become disabled by workpiece chips and the like.

What is claimed is:

1. In a machine tool system which includes a plurality of work stations and means at some of said work stations for supporting workpieces, a stationary track assembly extending longitudinally past said work stations, a plurality of workpiece holding units mounted on said track assembly and movable longitudinally thereof for advancing workpieces carried thereby to successive work stations, each of said units including a body member and a pair of jaws, means mounting said pair of jaws on said body member for rotatable movement about substantially parallel axes between a workpiece release position located above workpieces at said work stations and a workpiece gripping position extending downwardly and disposed in gripping engagement with horizontally opposite sides of a workpiece, a pair of substantially parallel shafts on said body member located on said axes and supporting said jaws so that in said release position said jaws extend generally horizontally away from each other and in said gripping position said jaws extend downwardly from said shafts, a pair of gear members on said shafts which mesh with each other and are operable in response to concurrent rotation thereof to rotate said jaws in opposite directions, said gear members being of substantially the same diameter and one of said gear members being of greater axial length than the other gear member, and a rack member engageable with said one of said gear members and spaced axially from said other gear member, said rack member being operable to provide for rotation of said one gear member.

2. The structure according to claim 1 further including a second pair of jaws spaced axially from said first pair and rotatable about said axes, meshing gear members for rotating said second pair of jaws, a second rack member for rotating said last mentioned meshing gear members, and means connected to said rack members and operable to reciprocate said rack members in unison to in turn move said pairs of jaws in unison.

* * * * *